(12) United States Patent
Serkh (10) Patent No.: US 8,360,908 B2
(45) Date of Patent: Jan. 29, 2013

(54) EXPANDABLE PULLEY

(75) Inventor: Alexander Serkh, Troy, MI (US)

(73) Assignee: The Gates Corporation, Denver, CO (US)

( * ) Notice: Subject to any disclaimer, the term of this patent is extended or adjusted under 35 U.S.C. 154(b) by 1111 days.

(21) Appl. No.: 11/986,769

(22) Filed: Nov. 26, 2007

(65) Prior Publication Data

US 2009/0137353 A1    May 28, 2009

(51) Int. Cl.
*F16H 9/10* (2006.01)
*F16H 7/00* (2006.01)

(52) U.S. Cl. .......................................... 474/49; 474/140

(58) Field of Classification Search .............. 474/49, 474/50, 54, 56, 52, 148
See application file for complete search history.

(56) References Cited

U.S. PATENT DOCUMENTS

| | | | | |
|---|---|---|---|---|
| 698,854 A | * | 4/1902 | Pratt | 474/53 |
| 1,496,032 A | * | 6/1924 | Sleeper | 474/50 |
| 1,626,701 A | * | 5/1927 | Sleeper | 474/50 |
| 2,004,224 A | * | 6/1935 | Silber | 474/50 |
| 3,935,751 A | | 2/1976 | Lee | 74/230.18 |
| 3,969,948 A | * | 7/1976 | Pipenhagen, Jr. | 474/50 |
| 4,325,702 A | | 4/1982 | Jacobsson et al. | 474/56 |
| 4,608,034 A | | 8/1986 | Reswick | 474/49 |
| 4,850,939 A | | 7/1989 | Chilcote et al. | 474/49 |
| 4,854,921 A | | 8/1989 | Kumm | |
| 4,969,857 A | | 11/1990 | Kumm | 474/49 |
| 5,582,555 A | | 12/1996 | Miller | |
| 5,772,546 A | | 6/1998 | Warszewski | |
| 5,984,814 A | * | 11/1999 | Davenport | 474/50 |
| 2004/0038763 A1 | * | 2/2004 | Serkh | 474/54 |
| 2007/0054766 A1 | | 3/2007 | Shamis et al. | |

FOREIGN PATENT DOCUMENTS

KR    10-2001-0067908 A    7/2001

OTHER PUBLICATIONS

The American Heritage Dictionary, Fourth Edition, 2001, p. 202.*

* cited by examiner

*Primary Examiner* — Michael Mansen
*Assistant Examiner* — Robert T Reese
(74) *Attorney, Agent, or Firm* — J. A. Thurnau, Esq.; P. N. Dunlap, Esq.

(57) ABSTRACT

An expandable pulley comprising a plurality of adjacent segments, each segment being radially moveable, each segment slidingly engaged with a pin member, each pin member having an engagement with each segment such that each segment is moveable in a direction substantially at an angle (α) to a radial along each pin member, a moveable guide member engaged with each segment for spatially locating each segment with respect to another segment, a counterweight cooperatively connected to each segment and cooperatively engageable with each pin member, each counterweight exerting a force opposing a segment centripetal force, and each pin member connected to a hub.

10 Claims, 8 Drawing Sheets

EXPANDABLE PULLEY

FIELD OF THE INVENTION

The invention relates to an expandable pulley and more particularly, to an expandable segmented pulley having an effective diameter that is variably determined according to an externally applied toque.

BACKGROUND OF THE INVENTION

It is known that the accessory belt drive for hybrid electric vehicles may include a belt driven starter/generator. For such a system special belt tensioning is provided to satisfy both modes of operation: starting and generating. In prior art systems two tensioners can be used, for example, a hydraulic tensioner is installed on the belt slack side of the alternator and a mechanical torsion spring tensioner is installed on the belt tight side of the alternator.

Representative of the art is U.S. Pat. No. 3,935,751 (1976) which discloses a stepless speed changing device and more particularly to the construction of an automatic speed changing device suitable for a vehicle or the like, the centrifugal force of said changing device is produced by the high-speed rotation of a rotating means which enables a plurality of claw blocks fitted pivotedly at a rotating disk to expand outward to increase the outside diameter thereof, and which, after the output of motive force, can produce automatically differential speed ratios of various magnitudes because of the change of said working outside diameters What is needed is an expandable segmented pulley having an effective diameter that is variably determined according to an externally applied toque. The present invention meets this need.

SUMMARY OF THE INVENTION

The primary aspect of the invention is to provide an expandable segmented pulley having an effective diameter that is variably determined according to an externally applied toque.

Other aspects of the invention will be pointed out or made obvious by the following description of the invention and the accompanying drawings.

The invention comprises an expandable pulley comprising a plurality of adjacent segments, each segment being radially moveable, each segment slidingly engaged with a pin member, each pin member having an engagement with each segment such that each segment is moveable in a direction substantially at an angle ($\alpha$) to a radial along each pin member, a moveable guide member engaged with each segment for spatially locating each segment with respect to another segment, a counterweight cooperatively connected to each segment and cooperatively engageable with each pin member, each counterweight exerting a force opposing a segment centripetal force, and each pin member connected to a hub.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
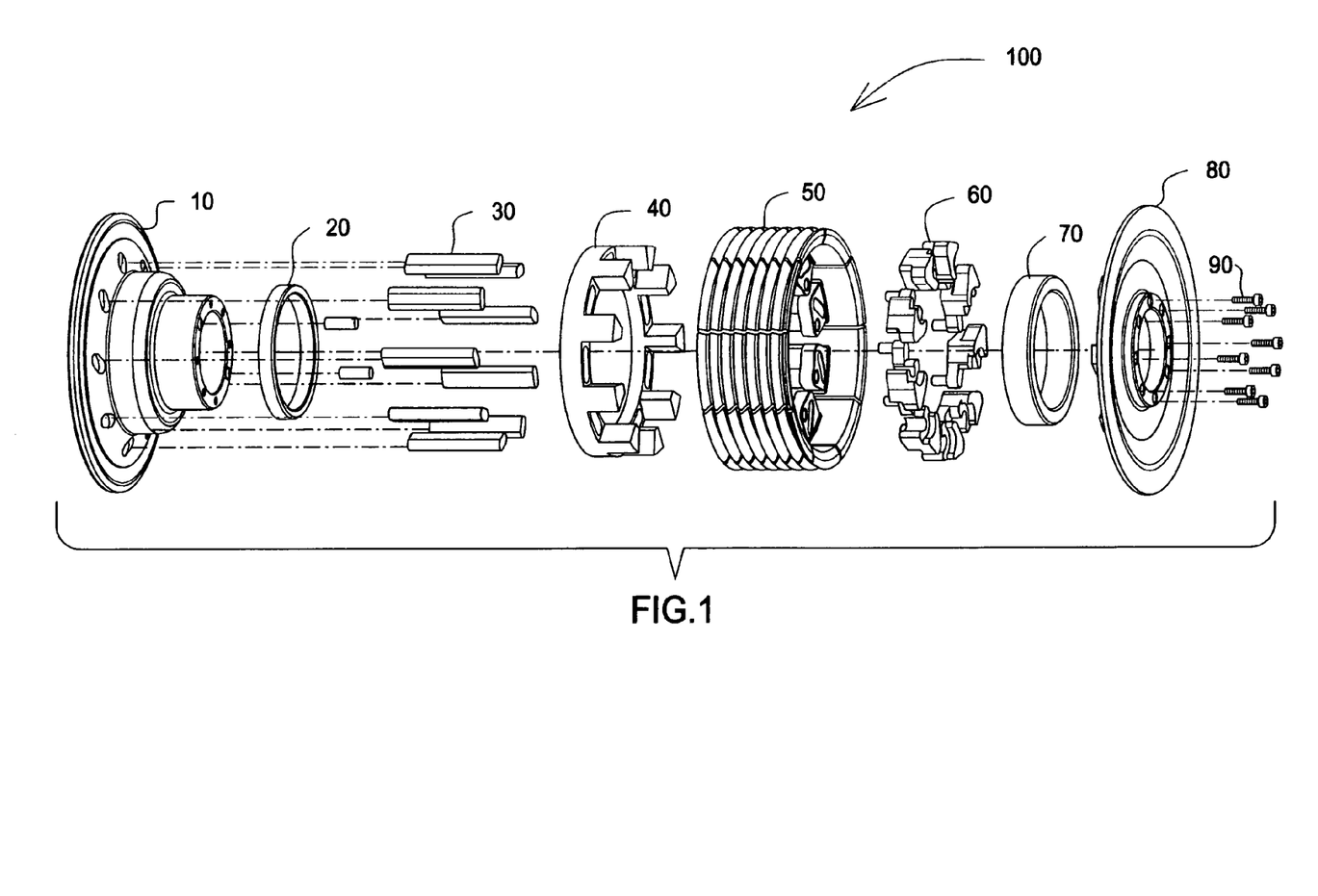
FIG. 1 is an exploded view of the expandable pulley.

FIG. 1 is an exploded view of the expandable pulley. Pulley 100 comprises hub 10, segment stop 20, segment pin members 30, segment guide 40, segments 50, counterweights 60, compressible member 70 and back plate 80. The assembly is held together with fasteners 90, which may comprise screws or bolts. Fasteners 90 extend from back plate 80 to hub 10.

Figure 2:
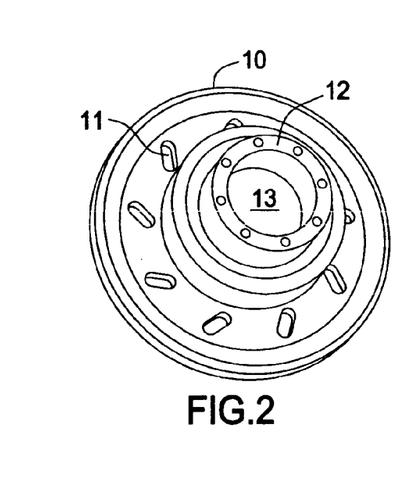
FIG. 2 is a detail of the hub.

FIG. 2 is a detail of the hub. Hub 10 comprises a detent 11 for receiving each segment pin member 30. Detents 11 are arranged in a circular manner about hub 10. Hub 11 also comprises a rim 12, which rim 12 projects in an axial direction from hub 10. For attaching the pulley to an accessory or other mounting surface, a mounting shaft extends through bore 13, for example, see FIG. 18. Fasteners 90 engage holes in hub 12.

Figures 3, 4:
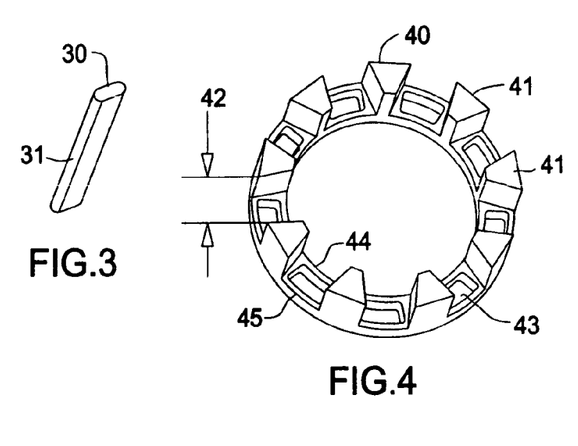
FIG. 3 is a detail of the segment pin member.
FIG. 4 is a detail of the segment guide.

FIG. 3 is a detail of the segment pin member. Each segment pin member 30 engages hub 10. Each segment 50 slidingly engages a segment pin member 30. Each segment pin 30 comprises an outer surface 31 which engages each segment 50 by a sliding engagement with each slot 53. Each segment pin member 30 comprises a slightly arcuate shape (see FIG. 15) having a radius $r_2$, which facilitates movement of segment 50 as described elsewhere in this specification. Each segment pin member 30 is the means by which each segment 50 and counterweight 60 are retained in the pulley 100 during rotation of the pulley.

FIG. 4 is a detail of the segment guide. Segment guide 40 comprises wedge shaped members 41 which extend radially outward with an apex directed radially inward. A gap 42 is disposed between each member 41. A segment member 52 is disposed in each gap 42. Guide 40 further comprises rings 43, 44. The purpose of rings 43, 44 is to properly spacially locate each segment guide 41.

Segment guide 40 is not fixedly connected to hub 10 or backing plate 80 or to any segment 50. That is, segment guide 40 "floats" between each segment 50 and hub 10, see FIG. 18. This in turn allows segment guide 40 to partially rotate within the pulley as needed to allow each segment 50 freedom to move radially and circumferentially while maintaining proper alignment with a segment pin member 30 and with each adjacent segment 50.

In this preferred embodiment member 30 is described as a segment pin member. However, the function of segment pin member 30 is accomplished by surface 31 of segment pin member 30. Surface 31 may also be realized by extending a cantilever portion or other axial projection from hub 10 or back plate 80 into a position whereby there is contact with slot 53 in a manner to control a position of segment 50.

Figure 5:
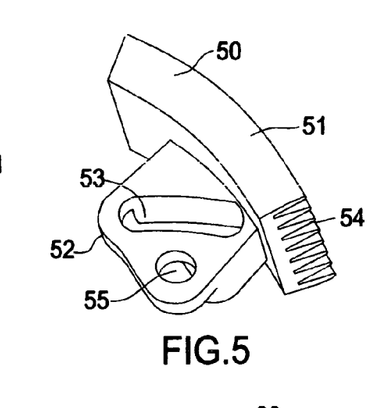
FIG. 5 is a detail of the segment.

FIG. 5 is a detail of the segment. The pulley 100 comprises a plurality of segments 50 disposed about an outer perimeter. Segment 50 comprises an arcuate portion 51. Portion 51 comprises a surface 54 which engages a belt (not shown). Surface 54 is shown having a multi-ribbed profile, although a flat belt and a single v-rib profile is also suitable.

Member 52 extends from portion 51 radially inward toward the center of the pulley. Member 52 is typically disposed normal to portion 51. Member 52 comprises a slot 53 and a hole 55. A counterweight 60 engages each segment 50 through hole 55, see FIG. 7. For example, each segment may have a mass on the order of approximately 8 gm.

Figure 6:
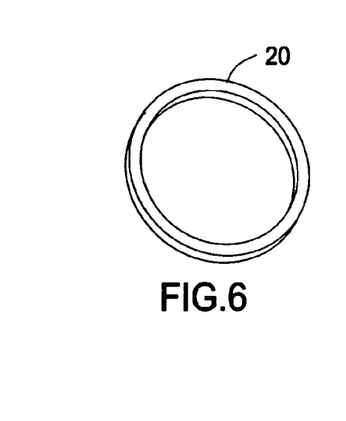
FIG. 6 is a detail of the segment stop.

FIG. 6 is a detail of the segment stop. Segment stop 20 is ring shaped and may comprise an elastomeric or other resilient material, which can include plastics, natural rubber or synthetic rubber or their equivalents or combinations. Segment stop 20 acts as a radially inner-most limit to movement of each segment 50.

Figure 7:
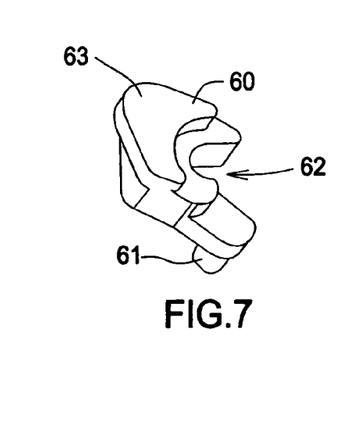
FIG. 7 is a detail of the counterweight.

FIG. 7 is a detail of the counterweight. Counterweight 60 comprises a pin 61 which pivotally engages hole 55 in segment 50. Counterweight 60 comprises a predetermined mass which acts to oppose a centripetal force imparted by each segment by rotation of the pulley while in use. Notch 62 cooperatively engages a segment pin member 30. The bulk of the counterweight mass is located in lobe 63. For example, each counterweight may have a mass on the order of approximately 8 gm.

Figures 8, 9:
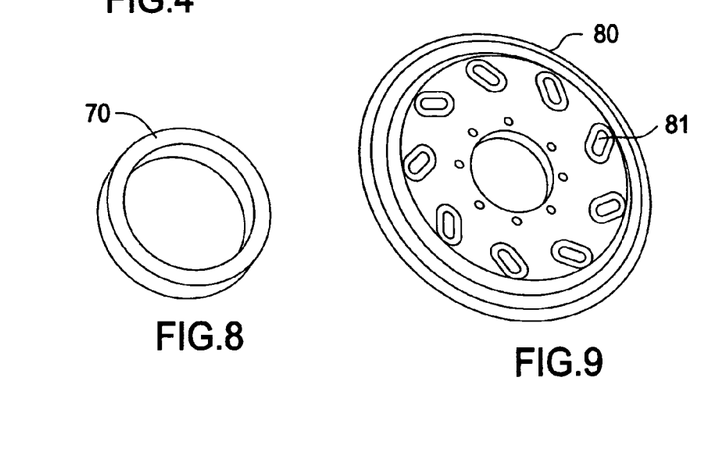
FIG. 8 is a detail of the compressible member.
FIG. 9 is a detail of the back plate.

FIG. 8 is a detail of the compressible member. Compressible member 70 comprises an elastomeric or other resilient material, which can include plastics, natural rubber or synthetic rubber or their equivalents or combinations. In operation each counterweight 60 pivots about pin 61 and segment pin member 30 in a manner which causes each counterweight to come into contact with compressible member 70. Compressible member 70 serves as a resilient means to stop movement of each counterweight in a predetermined position. In most cases, the position in which each counterweight 60 engages compressible member 70 generally corresponds with the maximum radial position of each segment 50.

FIG. 9 is a detail of the back plate. Back plate 80 is typically flat and circular in shape. Each detent 81 receives an end of segment pin member 30. Each detent 81 aligns with a cooperating detent 11 on hub 10.

Fasteners 90 connect back plate 80 to holes in hub rim 12. Fasteners 90 comprise screws or any other suitable fastener known in the art.

Figure 10:
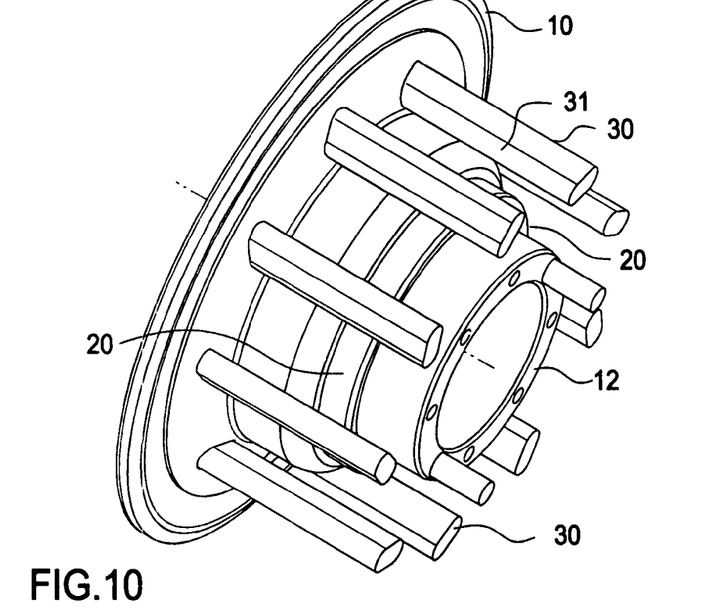
FIG. 10 is a partial detail of the expandable pulley hub.

FIG. 10 is a partial detail of the expandable pulley hub. Segment pin members 30 are shown engaged with hub 10 in detents 11. Segment stop 20 is shown engaged about rim 12.

Figure 11:
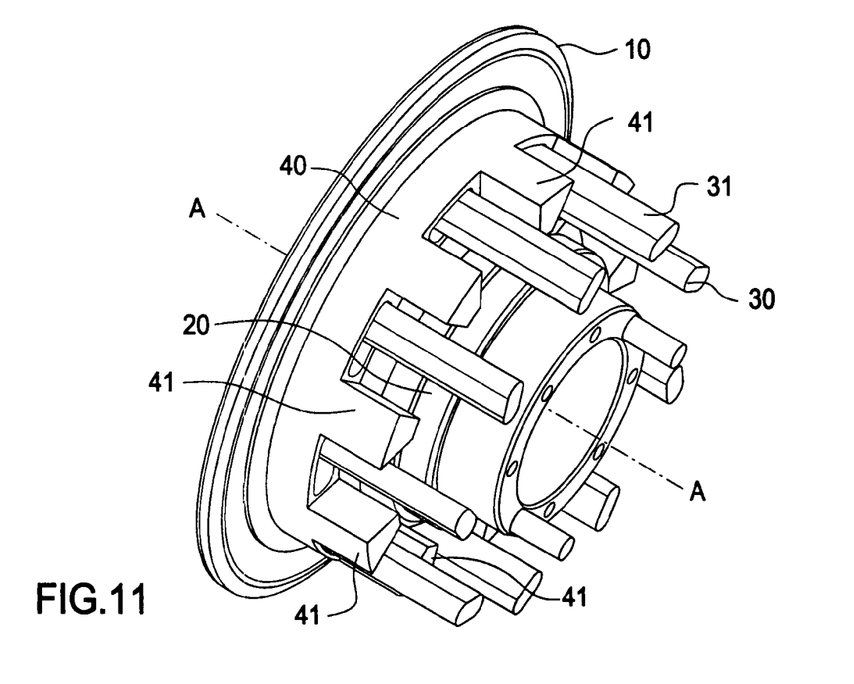
FIG. 11 is a partial detail of the expandable pulley.

FIG. 11 is a partial detail of the expandable pulley. Segment guide 40 is disposed adjacent to hub 10. Segment pin members 30 extend through rings 43, 44 of guide 40. Each segment pin member 30 projects through each gap 42 between each member 41. Each segment pin member extends in an axial direction substantially parallel with an axis of rotation A-A. Segment guide 40 is not otherwise fastened to the hub 10 nor to the segment pin members 30, but instead is loosely held in this position by the relationship of the various described components. This allows segment guide 40 the freedom to move in response to movement of segments 50.

Figure 12:
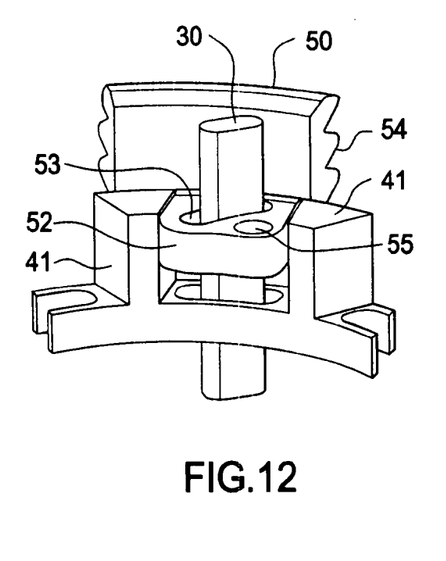
FIG. 12 is a detail of the expandable pulley segment.

FIG. 12 is a detail of the expandable pulley segment. Member 52 is slidingly engaged in gap 42 between each member 41. Gap 42 is wide enough to allow member 52 sliding movement through slot 53 along segment pin 30, that is, slot 53 slidingly moves along segment pin member 30. Slot 53 is disposed at an angle α with respect to a radial in the range of approximately 30 to 50°, see FIG. 20.

Figure 13:
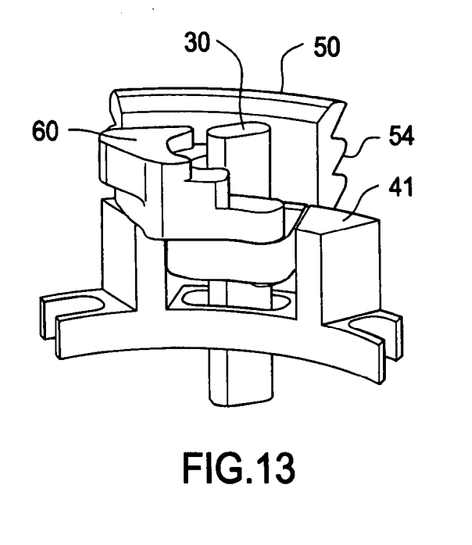
FIG. 13 is a detail of the expandable pulley segment and counterweight.

FIG. 13 is a detail of the expandable pulley segment and counterweight. Counterweight 60 is pivotally engaged with segment 50 by a pin 61 that is pivotally inserted into hole 55. Segment pin member 30 engages notch 62. Counterweight 60 and segment guide 40 are fully contained within a width of segment 50. Width is in the vertical axis in this FIG. 13, parallel to segment pin member 30. Segment surface 54 has a multi-ribbed profile for engaging a multi-ribbed belt (not shown).

Figure 14:
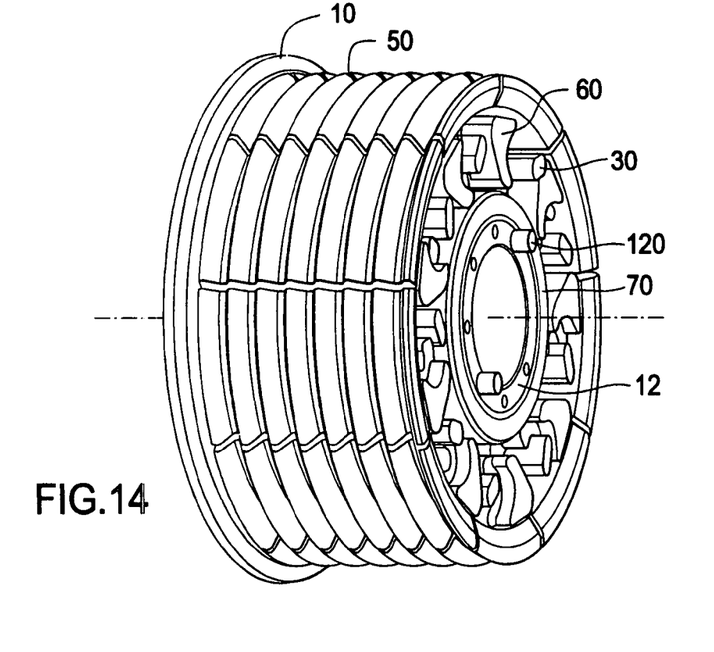
FIG. 14 is a perspective view of the expandable pulley.

FIG. 14 is a perspective view of the expandable pulley. Member 70 is disposed about rim 12. Back plate 80 and fasteners 90 are omitted from this perspective view. Segments 50 are shown in a partially open position. Pins 120 align hub 10 with back plate 80.

Figure 15:
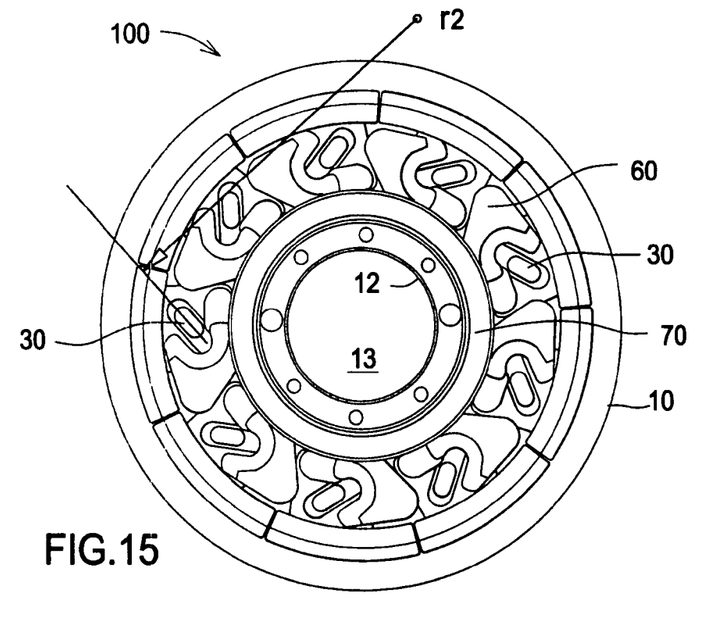
FIG. 15 is a side view of the expandable pulley in the closed position.

FIG. 15 is a side view of the expandable pulley in the closed position. A plurality of segments 50 are adjacently disposed about the circumference of the pulley 100. Pulley 100 comprises cooperating segment combinations, each combination comprising a segment 50, segment pin member 30 and counterweight 60. Each segment 50 is properly located on the pulley circumference by adjacent segments 50. The pulley in FIG. 15 is shown in the "closed" position, that is, each segment 50 is in contact with each adjacent segment 50. Each counterweight 60 lightly bears upon member 70.

Each segment in member 30 comprises a radius $r_2$. Radius $r_2$ allows each slot 53 to move in an arc as each segment 50 moves radially as described in FIG. 16.

Figure 16:
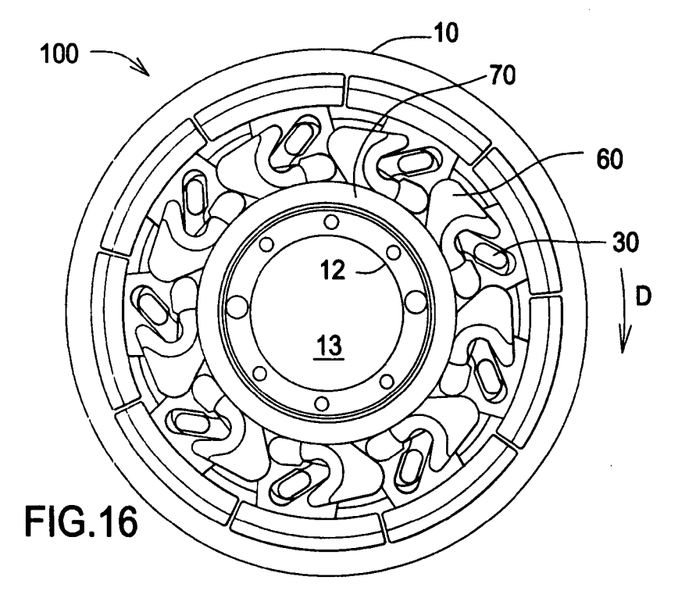
FIG. 16 is a side view of the expandable pulley in the partially open position.

FIG. 16 is a side view of the expandable pulley in the partially open position. This FIG. 16 shows the pulley partially expanded, as would be the case when the pulley is rotating. Each segment 50 has moved radially outward a predetermined distance, and in doing so slot 53 has moved partially along segment pin 30. Each counterweight 60 has partially pivoted about pin 61. This is because each counterweight 60 also bears upon each segment pin member 30 at each notch 62.

For example, as each segment 50 moves radially outward, it also has a component of movement in direction "D". As segment 50 moves in direction "D" so does hole 55 and thereby counterweight 60. A slight movement of each counterweight 60 in direction "D" causes each notch 62 to bear upon segment pin 30. In effect, contact between notch 62 and segment pin 30 causes each counterweight 60 to pivot about segment pin 30 at notch 62 and about pin 61. Engagement with pin 30 and thereby segment pin member surface 31 in turn retains each segment 50 and counterweight 60 in proper position within pulley 100. As a further part of this movement guide member 40 also partially rotates in order to maintain proper alignment of each segment with respect to the other segments.

Figure 17:
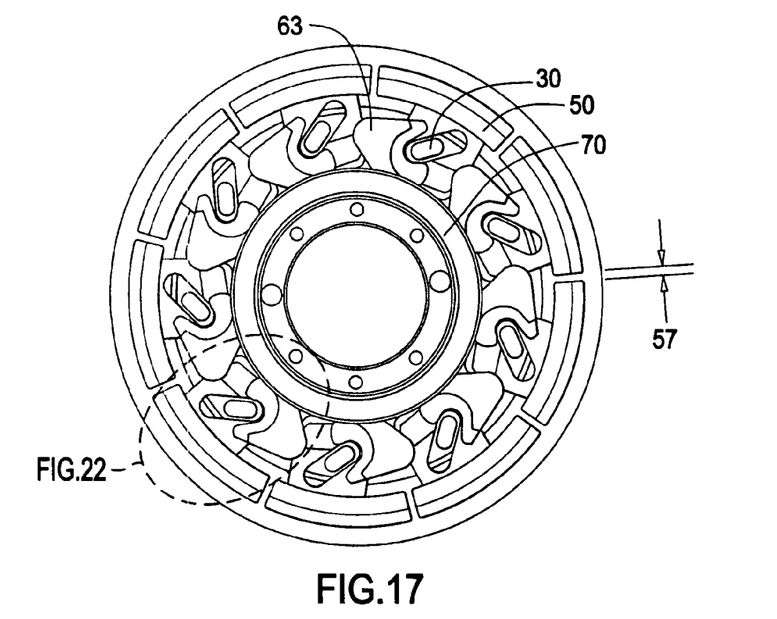
FIG. 17 is a side view of the expandable pulley in the fully open position.

FIG. 17 is a side view of the expandable pulley in the fully open position. As each segment 50 moves radially outward under the influence of centripetal force, the pulley effective diameter increases and a gap 57 between each segment enlarges. The radially outward limit of movement of each segment 50 is determined by engagement of each counterweight with member 70. Each lobe 63 moves radially inward thereby bearing with increasing force upon member 70. Ultimately, contact with member 70 stops all further inward movement of counterweight 60, which in turn stops all further outward movement of each segment 50.

Figure 18:
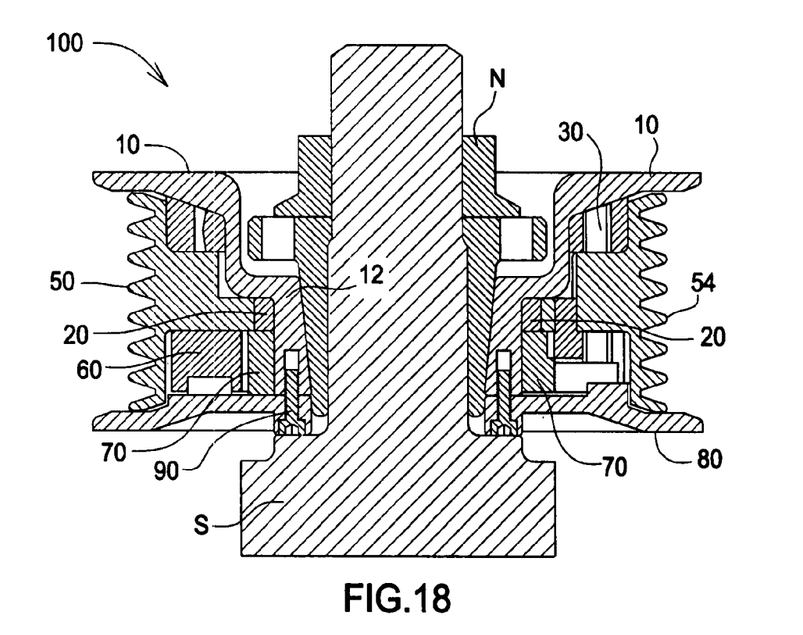
FIG. 18 is a cross-sectional view of the expandable pulley.

FIG. 18 is a cross-sectional view of the expandable pulley. Expandable pulley 100 is typically installed on a rotating shaft "S". Shaft "S" may extend from an accessory such as may be used on a motor or engine (not shown). The accessory may comprise an alternator, or motor-generator, or water pump, or power steering pump, or other rotating accessory. Pulley 100 is secured to a threaded end of shaft S using a nut "N".

Figure 19:
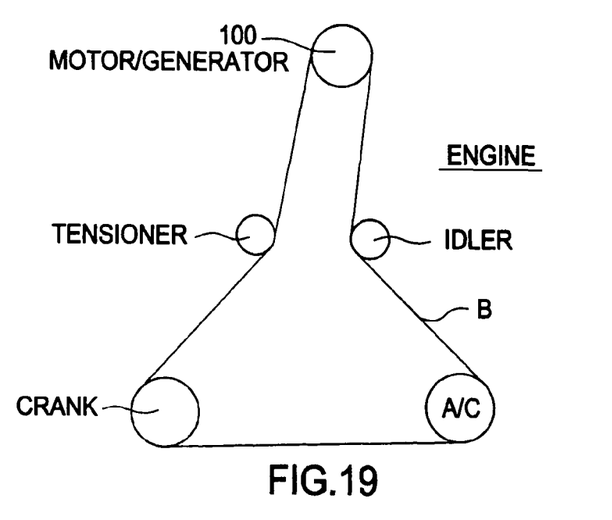
FIG. 19 is a schematic of a belt drive system using the expandable pulley.

The effective drive ratio of the system shown in FIG. 19 can be changed by the change in effective diameter of the expandable pulley which is caused by the outward movement of the segments 50.

For example, an expandable pulley having a "closed" diameter of approximately 60 mm may expand to a diameter of approximately 65 mm at an operating speed of approximately 4000 RPM. The increase in diameter of the pulley will cause the rotational speed of the pulley and thereby the accessory shaft (see "S", FIG. 18) to decrease by the ratio of:

$$Speed_1 \times Diameter_1 = Speed_2 \times Diameter_2$$

Solving:

$$Speed_2 = [(4000\ RPM) \times 60\ mm]/65\ mm$$

$$Speed_2 = 3692\ RPM$$

This represents a speed decrease of the accessory rotational speed which is proportional to the increase in diameter. As the rotational speed of the system increases a proportionate decrease in speed of the accessory may occur. The expandable pulley is suitable for a wide range of operational speeds, for example, up to approximately 14,000 RPM.

This example is offered for the sole purpose of illustration and is not intended to be limiting of the sizes, embodiments or uses for the inventive pulley.

FIG. 19 is a schematic of a belt drive system using the expandable pulley. In this example an inventive pulley 100 is connected to the motor/generator. The system also comprises a belt B, an idler, a tensioner and a pulley attached to the crankshaft. This example system can be used on a typical hybrid internal combustion engine. In the generating mode the crankshaft is driving the belt B. In the starting mode the motor/generator is used as a motor to drive belt B and thereby to rotate the crankshaft and thereby start the engine to which the belt drive system is attached.

Figure 20:
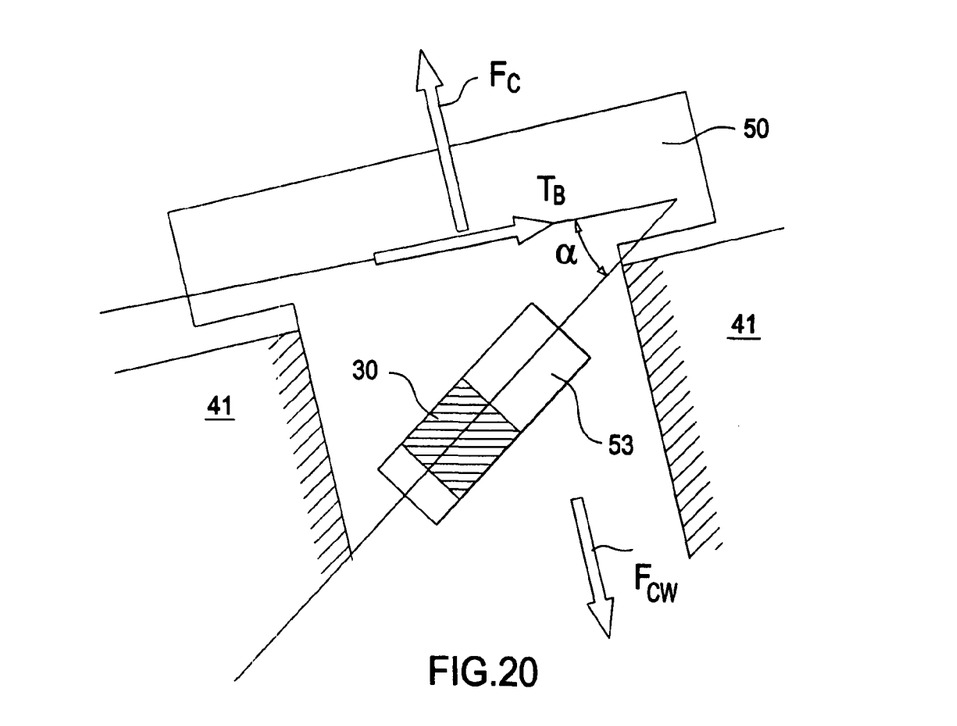
FIG. 20 is a schematic free body diagram of a segment system.

FIG. 20 is a schematic free body diagram of a segment system. In a first operating mode the expandable pulley segments 50 are in the most radially inward position as in FIG. 15. In this mode the pulley has a minimum diameter. Slot 53 for each segment 50 is substantially centered on pin member 30. Although the pulley is rotating, no torque is being applied to the pulley by a belt, hence there is no "torque" force $T_B$ acting normal to the centripetal force $F_C$ to urge the segment 50 in a direction normal to a radial direction. Put another way force $T_B$ acts substantially tangentially to each segment surface 54 with reference to the circumference of the pulley. Each counterweight 60 exerts a force ($F_{CW}$) which substantially balances force $F_C$ so each segment 50 does not move radially outward. Further, the force exerted by the counterweight ($F_{CW}$) operates to retract each segment once a belt torque is removed.

When a belt torque is applied to each segment, a force $T_B$ is exerted that is substantially normal to the centripetal force $F_C$. The lateral force $T_B$ urges the slot 53 for each segment 50 to move along each pin 30. Such lateral movement coupled with the radially outward centripetal force $F_C$ overcomes the force exerted by the counterweight ($F_{CW}$) which causes each segment 50 to move radially outward, which movement in turn increases the effective diameter of the pulley. Although the belt only engages and transmits torque to less than all of the segments 50 at any one time, any movement of one segment is equally transmitted to all of the other segments by guide member 40. Hence, movement of one segment is mimicked by all segments.

The pulley is torque sensitive, meaning that the effective diameter of the pulley varies in accordance with a torque force ($T_B$) applied by a belt to each pulley segment.

In this example an angle ($\alpha$) of approximately 45 degrees is sufficient to provide proper belt tension during starting mode. In generating mode the segments are collapsed radially inward and as a result the pulley has a minimum effective diameter. In each case the expandable pulley is connected to a motor/generator.

Figure 21:
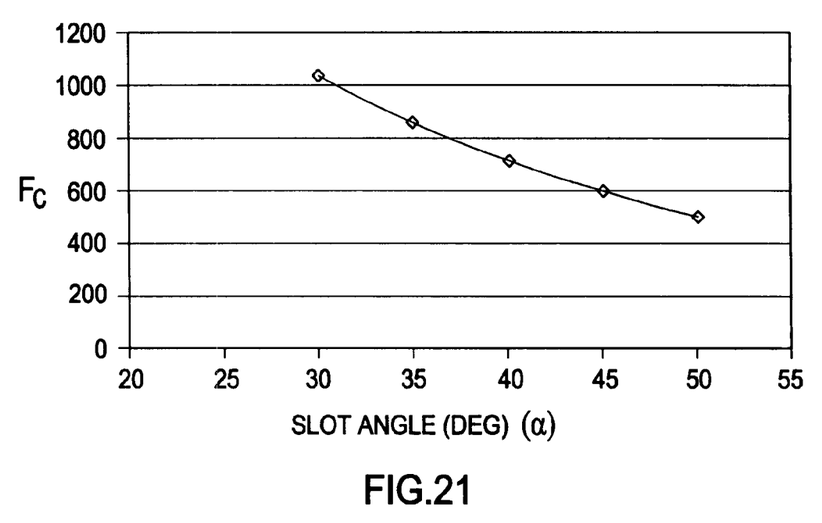
FIG. 21 is a graph of force as a function of slot angle.

The magnitude of force $F_C$ necessary to cause outward movement of each segment 50 (and thereby all segments 50) is a function of angle ($\alpha$), as well as the frictional forces imparted by the sliding movement of each of the described components, for example see FIG. 21. FIG. 21 is a graph of centripetal force as a function of slot angle.

"Starting mode" refers to use of the motor/generator as a starter to start the IC engine by driving belt B and thereby turning the engine crankshaft. "Generating mode" refers to use of the motor/generator as a generator to recharge a vehicle battery system (not shown). In generator mode the motor/generator is driven by the IC engine crankshaft through belt B.

Figure 22:
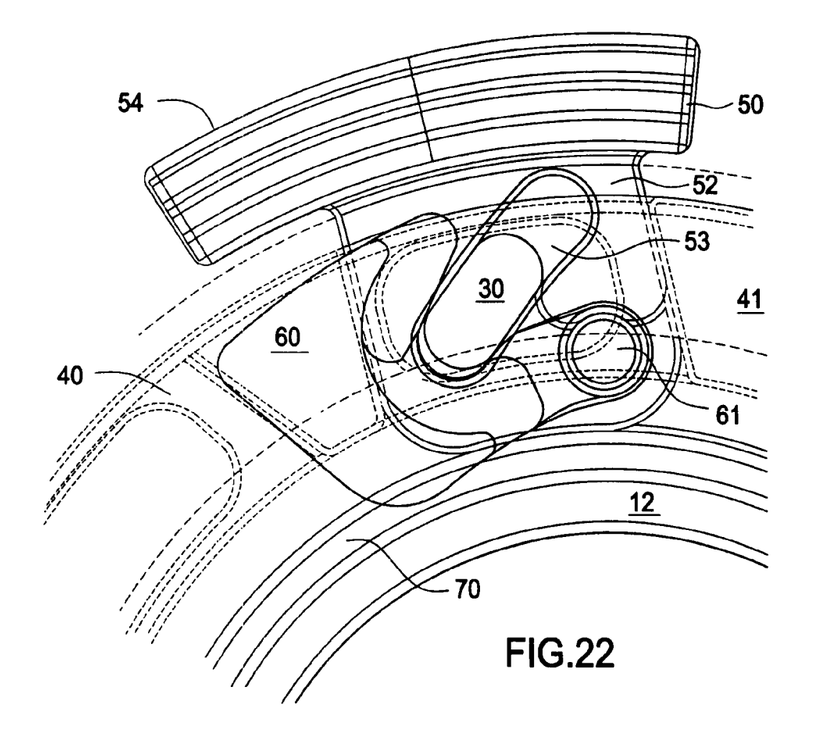
FIG. 22 is a detail of the pulley as shown in FIG. 17.

FIG. 22 is a detail of the pulley as shown in FIG. 17. The figure generally illustrates the combination of the segment 50, counterweight 60, segment pin member 30 and guide member 41. FIG. 22 shows the segment 50 in the open position because segment pin member 30 is shown at one end of slot 53. Segment pin member 30 is also shown engaged with notch 62. Gap 42 between members 41 serves to keep each segment 50 radially aligned as each segment loves radially outward. This is because as the pulley "opens" each segment 50 moves away from each of its neighbors. Hence segment guide 40 assures proper spacing and alignment as each segment moves outward and thereby out of contact with adjacent segments.

Although a form of the invention has been described herein, it will be obvious to those skilled in the art that variations may be made in the construction and relation of parts without departing from the spirit and scope of the invention described herein.

I claim:

1. An expandable pulley comprising:

a plurality of adjacent segments;

each segment being radially moveable;

each segment slidingly engaged with a pin member, each pin member having an engagement with each segment such that each segment is moveable in a direction substantially at an angle ($\alpha$) to a radial along each pin member;

a moveable guide member engaged with each segment for spatially locating each segment with respect to another segment;

a counterweight cooperatively connected to each segment and cooperatively engageable with each pin member, each counterweight exerting a force opposing a segment centripetal force; and each pin member connected to a hub.

2. The expandable pulley as in claim 1, wherein each segment comprises a slot for engaging the pin member.

3. The expandable pulley as in claim 1, wherein each counterweight is pivotally connected to each segment.

4. The expandable pulley as in claim 1 further comprising a resilient stop member engageable with each counterweight.

5. The expandable pulley as in claim 1, wherein each segment is moveable at an angle ($\alpha$) to a radial.

6. A belt drive system comprising:
  an expandable pulley connected to an engine accessory;
  the expandable pulley comprising:
    a plurality of adjacent segments;
    each segment radially moveable;
    each segment slidingly engaged with a pin member, each pin member having an engagement with each segment such that each segment is moveable in a direction substantially at an angle ($\alpha$) to a radial along each pin member;
    a moveable guide member engaged with each segment for spatially locating each segment with respect to all other segments;
    a counterweight cooperatively connected to each segment and cooperatively engageable with each pin member, each counterweight exerting a force opposing a segment centripetal force; and
    each pin member connected to a hub;
  a driver pulley; and
  a belt trained between the driver pulley and the expandable pulley.

7. The belt drive system as in claim 6, wherein the engine accessory comprises a motor/generator.

8. The belt drive system as in claim 6, wherein the driver pulley is connected to an engine crankshaft.

9. The belt drive system as in claim 6 further comprising a tensioner engaged with the belt.

10. The belt drive system as in claim 6, wherein the expandable pulley has a multi-ribbed profile.

* * * * *